US006810771B1

(12) United States Patent
Jackson

(10) Patent No.: US 6,810,771 B1
(45) Date of Patent: Nov. 2, 2004

(54) OVERDRIVE PISTON RETAINER

(75) Inventor: Scott C. Jackson, Chester, VT (US)

(73) Assignee: Sonnax Industries, Inc., Bellows Falls, VT (US)

(*) Notice: Subject to any disclaimer, the term of this patent is extended or adjusted under 35 U.S.C. 154(b) by 215 days.

(21) Appl. No.: 10/180,582

(22) Filed: Jun. 27, 2002

Related U.S. Application Data

(60) Provisional application No. 60/315,062, filed on Aug. 27, 2001.

(51) Int. Cl.$^7$ ............................ F16H 57/02; F16H 3/14; F16H 33/66
(52) U.S. Cl. .................... 74/606 R; 74/606 A; 384/313; 384/372; 184/6.12
(58) Field of Search ........................... 74/606 A, 606 R, 74/607, 467; 384/313, 316, 372, 380; 184/6.12

(56) References Cited

U.S. PATENT DOCUMENTS

| 3,863,737 | A | * | 2/1975 | Kakihara ..................... 384/316 |
| 4,474,483 | A | * | 10/1984 | Suzuki et al. ................ 384/114 |
| 4,523,861 | A | * | 6/1985 | Stella .......................... 384/475 |
| 5,480,234 | A | * | 1/1996 | Chen et al. ................. 384/313 |
| 5,619,888 | A | * | 4/1997 | Anthony .................... 74/606 R |
| 6,098,723 | A | * | 8/2000 | Yaniero et al. ............. 173/128 |

FOREIGN PATENT DOCUMENTS

| JP | 11-294496 | * | 10/1999 |

OTHER PUBLICATIONS

Sonnax Industries, "46RH, 46RE, 47RE", dated Apr. 18, 2001 [retrieved on Mar. 5, 2004] Retrieved from the Internet <url: www.transmission specialty.com/parts/parts22754N–01K.htm.*

Sonnax Industries, "42RH, 42RE, 44RE", dated Apr. 18, 2001 [retrieved on Mar. 5, 2004] Retrieved from the internet <url: http://www.transmissionspecialty.com/parts/PDF/12962N–01k(rb).pdf.*

* cited by examiner

*Primary Examiner*—David A. Bucci
*Assistant Examiner*—Colby Hansen
(74) *Attorney, Agent, or Firm*—Clifford F. Rey

(57) ABSTRACT

A replacement overdrive piston retainer for an automatic transmission that rotationally engages and interconnects the reverse drum within the transmission housing to the overdrive clutch assembly, which is mounted on the exterior of the housing is disclosed. An integral hub diameter formed on the present piston retainer provides a plurality of lubrication sites positioned at predetermined angular locations to deliver automatic transmission fluid to the interface of the hub diameter and the reverse drum in timed relation to the rotation of the reverse drum in an amount sufficient to maintain clearance and to minimize premature wear and galling at the interface of the components. In addition, lubrication reservoirs have been integrally formed within the hub diameter in fluid communication with the lubrication sites to improve the flow of automatic transmission fluid through the piston retainer to the mating interface of the hub diameter and the reverse drum.

20 Claims, 5 Drawing Sheets

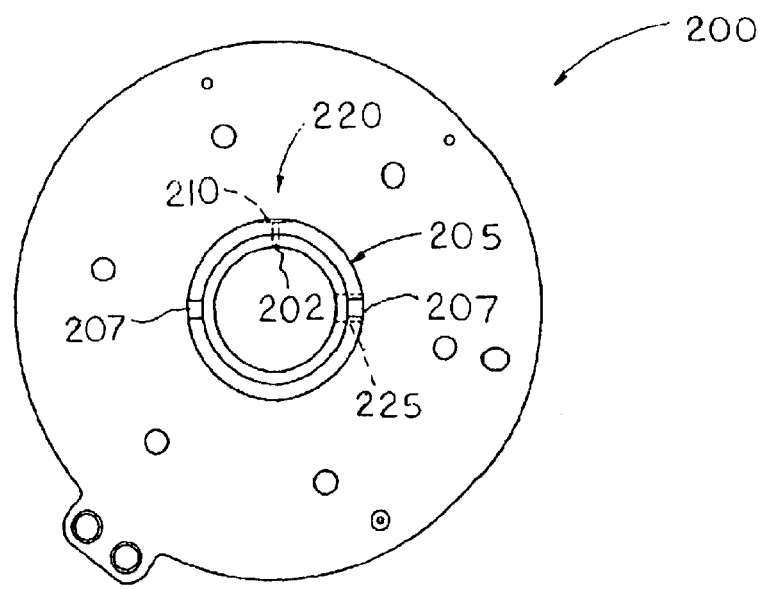
FIG. IA
PRIOR ART
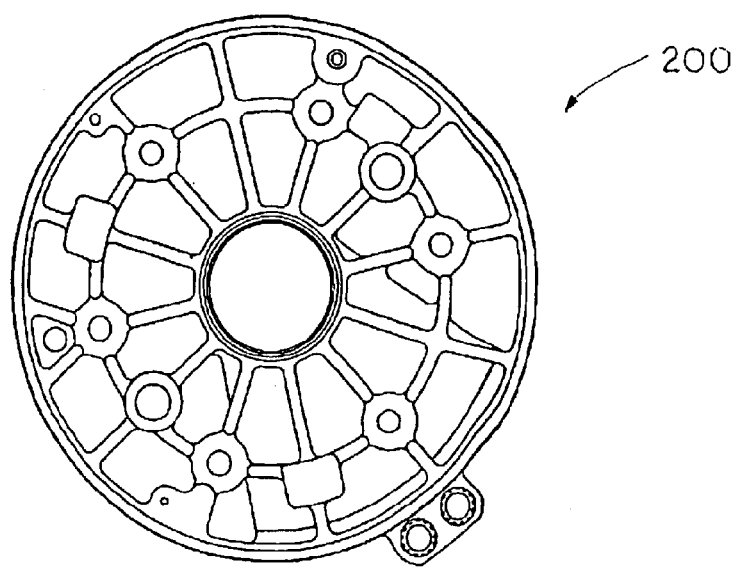
FIG. IB
PRIOR ART

OVERDRIVE PISTON RETAINER

CROSS-REFERENCE TO RELATED APPLICATION

This patent application claims the benefit under 35 U.S.C. 119(e) of U.S. Provisional Patent Application No. 60/315,062 filed Aug. 27, 2001, entitled Overdrive Piston Retainer.

BACKGROUND OF INVENTION

The present invention relates to automatic transmissions and, more particularly, to an improved overdrive piston retainer for Chrysler 42RE, 42RH, 46RE, 46RH, 47 RE, and 47 RH automotive transmissions (hereinafter "Chrysler transmissions").

The overdrive piston retainer in the aforementioned Chrysler transmissions functions as a receptacle for the overdrive piston and interconnects the reverse drum component disposed within the transmission housing to the overdrive assembly, which is mounted on the exterior of the housing. The intermediate shaft of the transmission extends coaxially through the reverse drum, through the hub diameter of the piston retainer, exits through the transmission housing, and engages the overdrive clutch assembly, which is mounted onto the aft side of the housing.

The original equipment manufacture (hereinafter "OEM") piston retainer in the Chrysler transmissions is susceptible to premature wear and galling on the hub diameter, which rotationally engages and supports the mating reverse drum. This is due in part to the clearance (0.015–0.020 inches), which must be maintained between these components to allow for thermal expansion of the hub diameter during operation. Galling between the mating surfaces of the OEM piston retainer hub diameter and reverse drum typically occurs adjacent a lubrication site (i.e. a circular machined flat and oil hole) that is located at a 12 o'clock (i.e. with reference to a superimposed clock face) or zero degree position at top dead-centre on the vertical centerline of the hub diameter.

Thus, the present invention has been developed to solve this problem providing a replacement overdrive piston retainer for the OEM overdrive piston retainer, which is standard equipment on the Chrysler transmissions and will be referred to throughout this specification.

SUMMARY OF THE INVENTION

Accordingly, the present invention provides a replacement overdrive piston retainer wherein a plurality of lubrication sites are positioned at predetermined locations to deliver lubricant evenly about the hub diameter and, more particularly, to the rotational contact interface between the hub diameter and the mating reverse drum that is susceptible to galling. In addition, lubrication reservoirs have been machined on the inside diameter (hereinafter "I.D.") of the hub diameter in fluid communication with the lubrication sites and with the cooler lube circuit to improve the flow of lubrication through the piston retainer to the mating surfaces of the hub diameter and reverse drum. Further, an annular groove with an O-ring seal has also been added to a shoulder diameter adjacent the hub diameter to retain automatic transmission fluid (hereinafter "ATF") between the hub diameter interface and the transmission housing.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 1A is an elevational view of the forward side of an overdrive piston retainer of a Chrysler transmission of the Prior Art showing the radial location of a lubrication site on the hub diameter;

FIG. 1B is an elevational view of the aft side of the Prior Art overdrive piston retainer of FIG. 1A;

DETAILED DESCRIPTION OF THE PREFERRED EMBODIMENTS

Figure 2A:
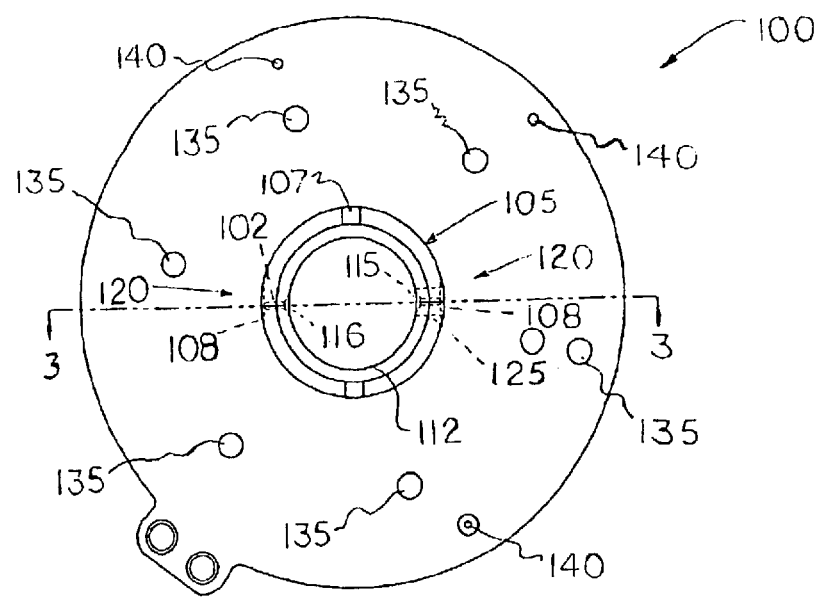
FIG. 2A is an elevational view of the forward side of the replacement overdrive piston retainer of the present invention showing radial orientation of the modified lubrication sites and fluid reservoirs.

With further reference to the drawings there is shown therein an overdrive piston retainer of the prior art, indicated generally at 200, and illustrated in FIGS. 1A and 1B. The prior art overdrive piston retainer 200 is typically manufactured from an A380 grade aluminum casting, which has relatively poor wear resistance characteristics for this application as explained hereinafter in further detail.

The hub diameter 205 of the prior art overdrive piston retainer 200, which rotationally engages the reverse drum component 150 (FIG. 5), includes a single lubrication site, indicated generally at 220, comprised of a generally circular, machined flat 210, which surrounds an oil hole 202 that is drilled into the flat and extends through the sidewall of the hub diameter 205. The hub diameter 205 may also include thrust washer recesses 207 formed in the end face thereof to receive the anti-rotation tabs of a thrust washer 175 (FIG. 5) therein for some applications.

Referring again to FIGS. 1A and 1B it will be appreciated that the piston retainer 200 is shown in its actual radial orientation as installed within the Chrysler transmissions. In such functional position the lubrication site 220 is oriented at a 12 o'clock (i.e. with reference to a clock face superimposed on FIG. 1A) or a zero degree position on the vertical centerline of the hub diameter 205. It is widely known in the industry that this portion of the hub diameter 205 (i.e. at the 12 o'clock location) in the Chrysler transmissions is susceptible to premature wear and galling due to rotational contact with the heavy, steel reverse drum component 150 as it contacts the machined flat 210, which comprises the lubrication site 220 formed on the hub diameter 205.

More particularly, the edges of the circular, machined flat 210 formed in the hub diameter 205 are prone to heat distortion. As a result the aluminum material used in the prior art construction melts and/or flows due to frictional engagement with the I.D. of the reverse drum 150, which results in galling on the hub diameter 205. Thus, the present replacement overdrive piston retainer has been developed to resolve this problem and will now be described.

Figure 2B:
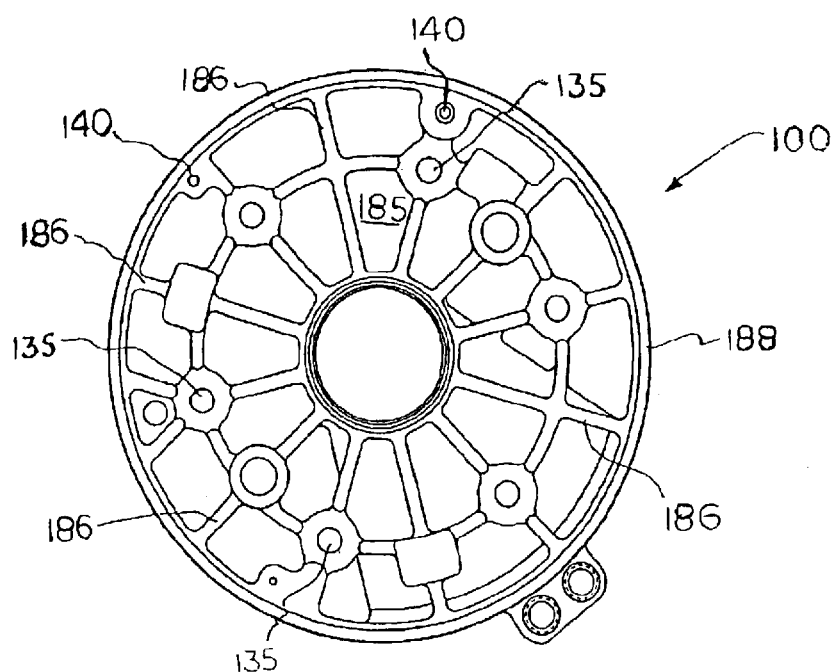
FIG. 2B is an elevational view of the aft side of the overdrive piston retainer of the present invention shown in FIG. 2A.

Referring now to FIGS. 2A and 2B there is shown therein an overdrive piston retainer in accordance with the present invention, indicated generally at 100. It will be appreciated that the present piston retainer 100 is also shown in its actual radial orientation as installed in the Chrysler transmissions. The present overdrive piston retainer is provided with structures comprising piston receiving means including, but not limited to, the following structures. The piston retainer 100 is a disc-shaped construction having a solid web 185 with a plurality of radially extending struts 186 on the aft face thereof for reinforcement of the web. The web 185 is integrally formed with a concentric hub diameter 105 and a concentric annular flange 188 defining a cylindrical receptacle or chamber 180 (FIG. 3) wherein the overdrive piston (not shown) is disposed. Mounting holes 135 are provided to receive machine screws 162 (FIG. 5) to secure the piston retainer 100 to the transmission housing. A plurality of ATF orifices 140 provide for ingress/egress of ATF within the piston chamber 180 during actuation of the overdrive piston (not shown).

Referring to FIG. 2A, it can be seen that in this embodiment the present overdrive piston retainer 100 is provided with a pair of lubrication sites 120 each having a generally rectangular-shaped flat 108 including an oil hole 102 extending through the hub diameter 105 to the inside diameter 112 thereof and being positioned on the horizontal centerline of the hub diameter. The lubrication sites 120 are located 180 degrees apart as most clearly shown in FIG. 3. It will be appreciated that flats 108 in the present retainer 100 are actually areas of non-cleanup (i.e. cast surfaces not machined) designed into the aluminum casting at a predetermined radial dimension such that machining of this feature is unnecessary, which eliminates the raised edges adjacent the machined flat 210 found in the OEM piston retainer 200 making the present lubrication sites 120 less susceptible to galling.

Further, it can be seen that the lubrication sites 120 including holes 102 are radially positioned along the horizontal centerline of the hub diameter 105 and the thrust washer recesses 107 are oriented along the vertical centerline. Thus, that portion of the hub diameter 105 at the 12 o'clock (or zero degree) position being most susceptible to galling due to rotational contact with the reverse drum 150 is an uninterrupted, cylindrical surface in the present invention. This uninterrupted surface at the top dead-centre (or zero degree) position of the present hub diameter 105 is much less prone to frictional wear and galling than that of the hub diameter 205 of the prior art.

Figure 3:
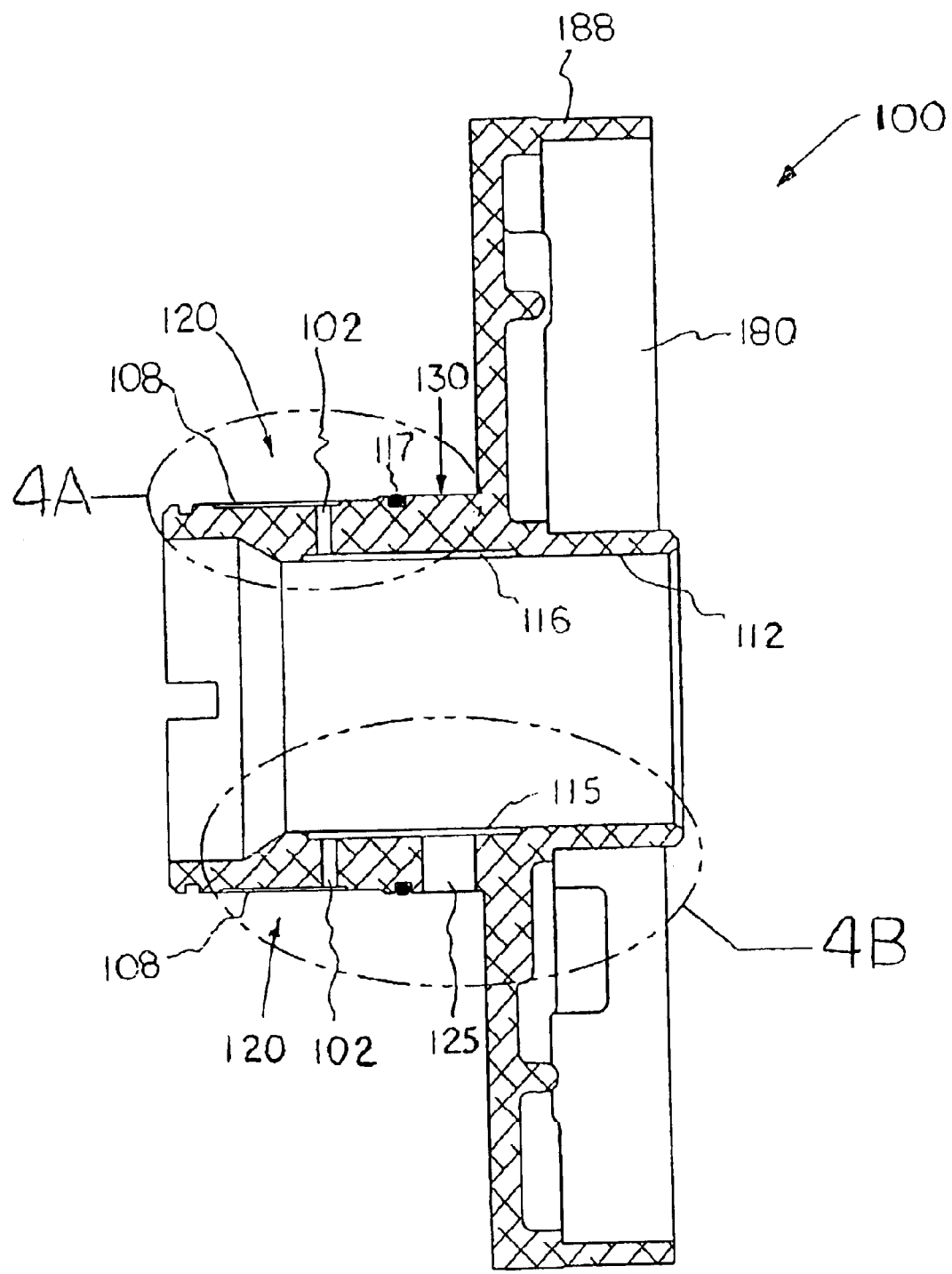
FIG. 3 is a cross-sectional plan view of the overdrive piston retainer of the present invention taken along the section line 3—3 of FIG. 2A showing further details of the construction thereof.

The inside diameter 112 of the present piston retainer 100 is also provided with a pair of lubrication reservoirs 115 and 116 that extend axially along the I.D. to the full length of the load bearing surface of the retainer 100 as shown in FIG. 3. Reservoirs 115 and 116 are semicircular in cross-section and are formed to a predetermined depth in fluid communication with holes 102.

A primary reservoir 115 is formed in fluid communication with port 125, which receives ATF under system pressure from the cooler lube circuit (not shown) integrally formed in housing 160.

Figure 5:
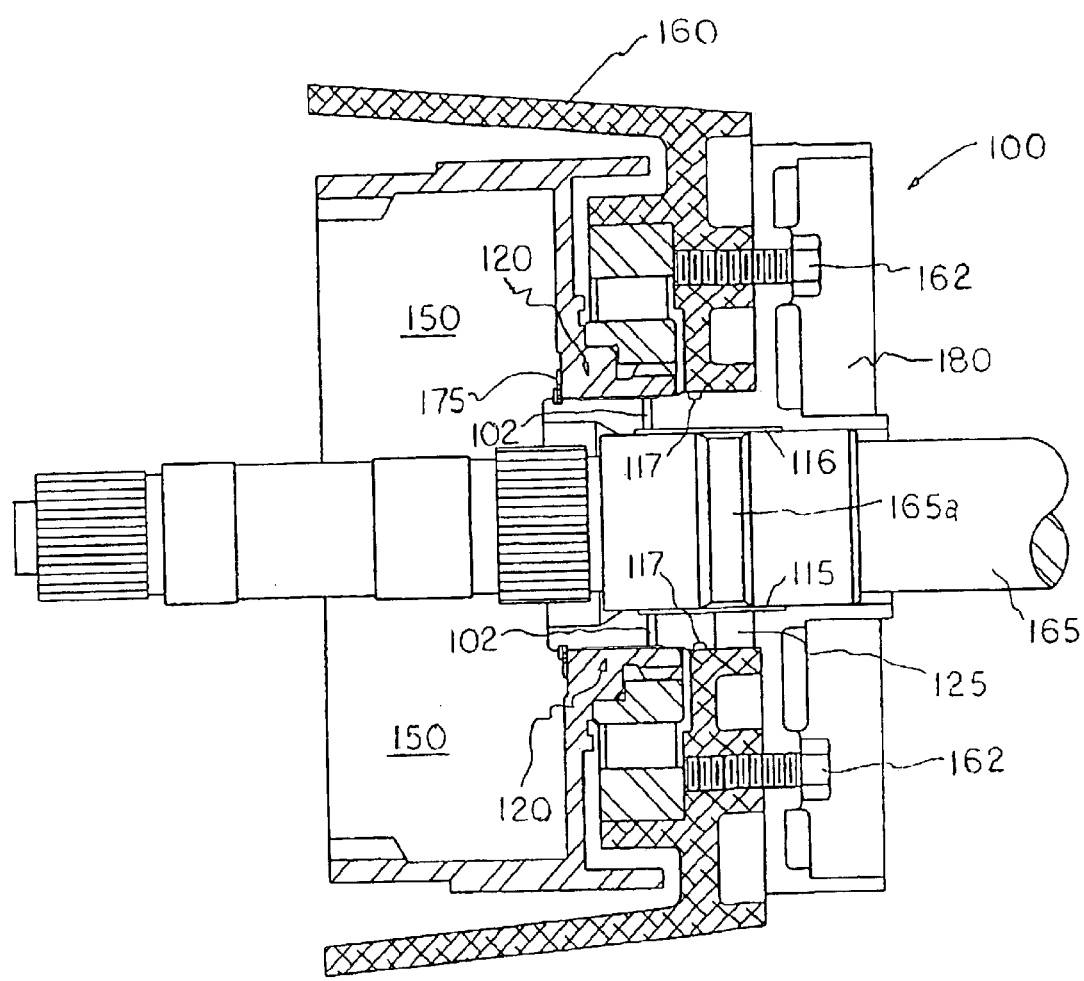
FIG. 5 is a cross-sectional plan view of the piston retainer installed in engagement with the reverse drum and mounted on the transmission housing.

Referring now to FIG. 5, the present piston retainer 100 is shown in its functional position installed on the exterior of the transmission housing 160 by machine screws 162. In operation ATF from the cooler lube circuit formed in the housing 160 is supplied under system pressure via the port 125 to the primary reservoir 115 and is delivered via hole 102 to the lubrication site 120 at the interface of hub diameter 105 and the reverse drum 150. More particularly, it will be appreciated that ATF enters this interface at the 3 o'clock or 270 degree position (i.e. when viewed from the forward side looking aft as shown in FIG. 2A) in advance of the aforementioned rotational contact zone at the damage prone zero degree position. ATF is also delivered to the secondary reservoir 116 at the 90 degree position directly from the undercut portion 165a of the intermediate shaft 165 and the space immediately surrounding it, which is in fluid communication with the reservoirs 115, 116 and continuously filled with ATF during operation.

As indicated hereinabove the reservoirs 115, 116 and their corresponding lubrication sites 120 are oriented along the horizontal centerline of the hub diameter 105 when the present piston retainer 100 is installed in its functional position as shown in FIG. 5. Thus, ATF is continuously delivered via holes 102 to the interface of hub diameter 105 and the reverse drum 150, which maintains a continuous film of ATF within the interface and a constant clearance between the reverse drum 150 and the hub diameter 105. This virtually eliminates any rotational contact at the damage prone 12 o'clock (or zero degree) position and the potential for galling on the hub diameter.

Figure 4A:
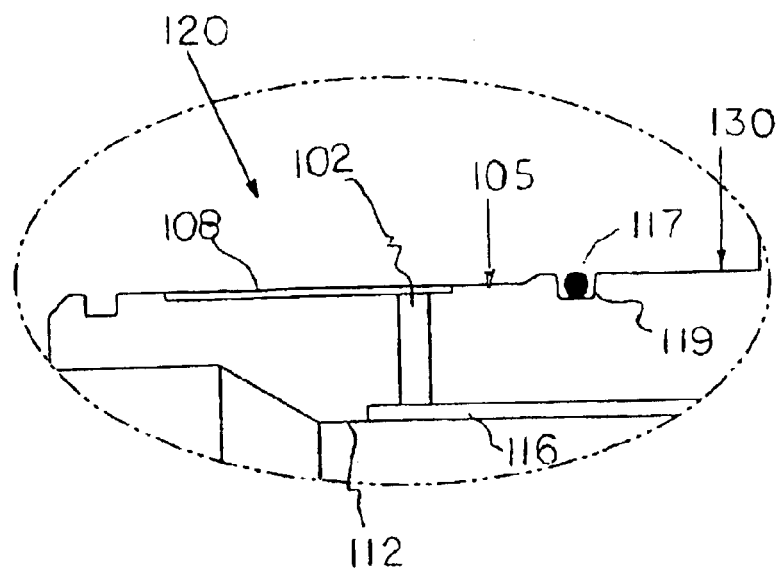
FIG. 4A is an enlarged cross-sectional view of the hub diameter of the overdrive piston retainer of FIG. 3 showing the secondary reservoir and lubrication site.
Figure 4B:
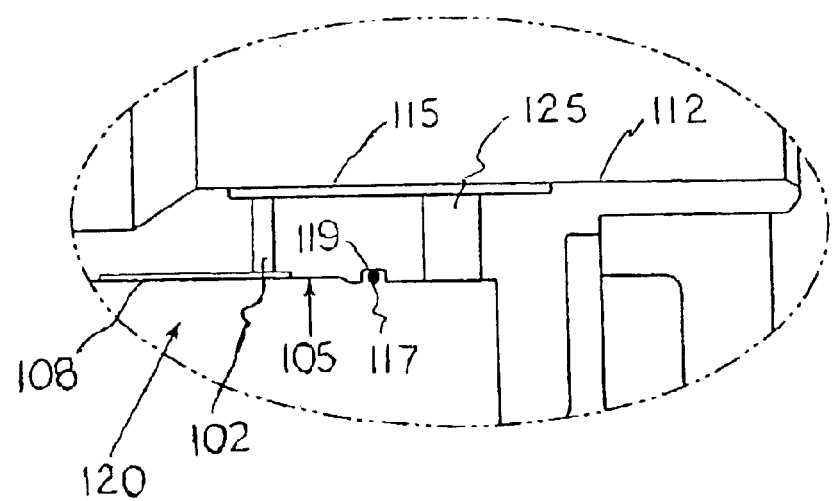
FIG. 4B is an enlarged cross-sectional view of the hub diameter of the overdrive piston retainer of FIG. 3 showing the primary reservoir and lubrication site.

Advantageously, the present piston retainer 100 is also provided with structures comprising sealing means including, but not limited to, the following structures. An O-ring seal 117 or other similar seal is disposed within an annular groove 119 formed in the shoulder diameter 130 adjacent the hub diameter 105 as most clearly shown in FIGS. 4A and 4B. This O-ring seal 117 is added in the present design to prevent ATF leakage from the interface of the hub diameter 105 and the reverse drum 150 to further enhance lubrication of these mating surfaces.

As shown in FIG. 5, the O-ring seal 117 is disposed within a mating bore formed in the housing 160 and functions to prevent leakage of ATF around the shoulder diameter 130 and away from the interface of the hub diameter 105 and the reverse drum 150. Of course, other sealing means may be devised for this purpose and, thus, the embodiment shown is merely illustrative and is not intended to be restrictive in any sense.

Although not specifically illustrated in the drawings, it should be understood that additional equipment and structural components will be provided as necessary and that all of the components described above are arranged and supported in an appropriate fashion to form a complete and operative piston retainer assembly incorporating the features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An overdrive piston retainer for an automotive transmission having a transmission housing wherein a cooler lube circuit is formed, said piston retainer functioning to support and interconnect a reverse drum component disposed within said housing to an overdrive assembly attached to an exterior of said housing via an intermediate shaft extending through said housing, said piston retainer being coupled to said housing in fluid communication with said cooler lube circuit, said piston retainer comprising:

a piston receiving means for engaging an overdrive piston, said piston receiving means including a coaxial hub diameter formed thereon for rotational engagement with the reverse drum component, said hub diameter further including at least one lubrication site formed thereon at a predetermined angular position such that hydraulic fluid is delivered from the cooler lube circuit through said lubrication site to the interface of said hub diameter and the reverse drum in timed relation to the rotation of the reverse drum component about said hub diameter; and lubricant retaining means disposed between said hub diameter and said transmission housing to retain hydraulic fluid within said interface.

2. An overdrive piston retainer of claim 1 wherein said lubricant retaining means comprises an O-ring seal installed within an annular groove formed on a shoulder diameter adjacent to said hub diameter, said O-ring seal retaining said hydraulic fluid within said interface in an amount sufficient to prevent galling of said hub diameter.

3. An overdrive piston retainer of claim 1 wherein said at least one lubrication site is radially oriented along the horizontal centerline of said hub diameter when said piston retainer is installed in its functional position on said housing such that said hydraulic fluid is delivered to said interface in advance of any rotational contact between said hub diameter and the reverse drum component.

4. An overdrive piston retainer of claim 1 wherein a pair of said lubrication sites are radially oriented at locations one-hundred and eighty degrees apart along the horizontal centerline of said hub diameter such that said hydraulic fluid is delivered from the cooler lube circuit to said interface at angular locations corresponding to two-hundred seventy degrees and ninety degrees relative to a zero degree position at top dead-centre.

5. An overdrive piston retainer of claim 4 wherein each of said lubrication sites is disposed in fluid communication with a fluid reservoir formed within said hub diameter for accumulation of hydraulic fluid for delivery to said interface.

6. An overdrive piston retainer of claim 5 wherein said fluid reservoirs are formed on an inside diameter of said hub diameter, each of said fluid reservoirs being disposed in fluid communication with said interface via at least one radially extending oil passage.

7. An overdrive piston retainer of claim 6 wherein said fluid reservoirs are semicircular in cross-section and extend to a predetermined axial length in fluid communication with said at least one oil passage.

8. An overdrive piston retainer of claim 1 wherein said piston retainer is fabricated from a B390 grade aluminum casting having physical characteristics suitable for use with mating steel components.

9. An overdrive piston retainer for an automotive transmission having a transmission housing wherein a cooler lube circuit is formed, said piston retainer functioning to support and interconnect a reverse drum disposed within said housing to an overdrive assembly attached to an exterior of said housing via an intermediate shaft extending through said housing, said piston retainer being coupled to said housing in fluid communication with said cooler lube circuit, said piston retainer comprising:

a piston receptacle for receiving an overdrive piston in reciprocating engagement, said piston receptacle including a concentric hub diameter for rotational engagement with the reverse drum component, said hub diameter further including at least one lubrication site formed thereon such that hydraulic fluid is delivered through said lubrication site from the cooler lube circuit to the interface of said hub diameter and the reverse drum, said at least one lubrication site being disposed at a predetermined location on said hub diameter such that hydraulic fluid is delivered to said interface in timed relation to the rotation of said reverse drum about said hub diameter; and an annular seal disposed between said hub diameter and said transmission housing to retain hydraulic fluid within said interface in an amount sufficient to prevent rotational contact between said hub diameter and said reverse drum.

10. An overdrive piston retainer of claim 9 wherein said at least one lubrication site is radially oriented along the horizontal centerline of said hub diameter when said piston retainer is installed in its functional position on said housing such that said hydraulic fluid is delivered to said interface at a position 270 degrees in advance of any rotational contact between said hub diameter and the reverse drum component.

11. An overdrive piston retainer of claim 9 wherein a pair of said lubrication sites are radially oriented at locations one-hundred and eighty degrees apart along the horizontal centerline of said hub diameter such that said hydraulic fluid is delivered from the cooler lube circuit to said interface at angular locations corresponding to two-hundred seventy degrees and ninety degrees in relation to a zero degree position at top dead-centre.

12. An overdrive piston retainer of claim 11 wherein each of said lubrication sites is disposed in fluid communication with a fluid reservoir formed within said hub diameter for accumulation of hydraulic fluid for delivery to said interface.

13. An overdrive piston retainer of claim 12 wherein said fluid reservoirs are formed on an inside diameter of said hub diameter, each of said fluid reservoirs being disposed in fluid communication with said interface by at least one radially extending oil passage.

14. An overdrive piston retainer of claim 13 wherein said fluid reservoirs are semicircular in cross-section and extend to a predetermined axial length in fluid communication with said at least one oil passage.

15. An overdrive piston retainer of claim 9 wherein said piston retainer is fabricated from a B390 grade aluminum casting having physical characteristics suitable for use with mating steel components.

16. An improved automatic transmission for a motor vehicle including a transmission housing wherein a cooler lube circuit is formed, said transmission further including an overdrive piston retainer for receiving an overdrive piston in reciprocating engagement, said piston retainer functioning to support and interconnect a reverse drum disposed within said housing to an overdrive assembly attached to an exterior of said housing via an intermediate shaft extending through said housing, said piston retainer being coupled to said housing in fluid communication with said cooler lube circuit, said piston retainer including a concentric hub diameter for rotational engagement with the reverse drum component, wherein the improvement comprises:

at least one lubrication site formed on said hub diameter such that hydraulic fluid is delivered from the cooler lube circuit to the interface of said hub diameter and the reverse drum, said at least one lubrication site being disposed at a predetermined angular position on said hub diameter such that hydraulic fluid is delivered to said interface in timed relation to the rotation of said reverse drum about said hub diameter in an amount sufficient to minimize rotational contact therebetween.

17. An improved automatic transmission of claim 16 wherein a pair of lubrication sites are disposed at angular locations corresponding to positions ninety degrees and two-hundred seventy degrees in relation to a zero degree position at top dead-centre of said reverse drum and said hub diameter.

18. An overdrive piston retainer of claim 17 wherein each of said lubrication sites is disposed in fluid communication with a fluid reservoir formed within said hub diameter for accumulation of hydraulic fluid for delivery to said interface.

19. An overdrive piston retainer of claim 18 wherein said fluid reservoirs are formed on an inside diameter of said hub diameter, each of said fluid reservoirs being disposed in fluid communication with said interface by at least one radially extending oil passage.

20. An overdrive piston retainer of claim 19 wherein said fluid reservoirs are semicircular in cross-section and extend to a predetermined axial length in fluid communication with said at least one oil passage.

* * * * *